Patented Apr. 15, 1952

2,592,588

UNITED STATES PATENT OFFICE 2,592,588

CASHEW OIL CONDENSATION AND POLYMERIZATION IN THE SHELL

Clarence T. Nemir, Washington, D. C., assignor to K. N. H. Corporation, Washington, D. C., a corporation of Delaware No Drawing. Application October 29, 1948, Serial No. 57,411

8 Claims. (Cl. 260—17.2)

The present invention relates to condensation and polymerization products of cashew nut oil and particularly to such products and method of forming the same in situ in the original shell.

Cashew nut oil is well known in the art to be converted to valuable condensation or polymerization products, or both, and is usually, after such chemical treatment, blended with various filler substances to make molding powders and other resinous products thereof. The oil itself, as normally extracted by heating, pressing or otherwise, is quite toxic and dangerous to workmen. The extracted cellulosic shell material is also a useful filler material.

By the present process it has been discovered that these valuable resinous products, either by condensation or polymerization or both, can be made in situ in the cellulosic shell material to form the resinous products with the natural filler, thereby saving not only the cost of extraction and the resulting danger of handling the extracted oil, but also the cost of the filler material normally subsequently added thereto. Thus, by the present method, no extraction or subsequent addition of filler material is made, but the resinification is effected in situ to form a final product with filler material therein with consequent great saving in the cost of materials, labor and danger of handling.

The resinification of the oil in situ in the shell, it is found, may be effected by treatment with condensing agents such as aldehydes, with or without catalysts of an alkali or acid nature, or may be effected by polymerization, such as by heat treatment in the presence of acids, oxidizing agents, halogenating agents, sulphurizing agents, or combinations thereof. It will be understood that the components of cashew nut oil, mainly anacardic acid and cardol, are phenols which have been substituted with long-chain drying oil acid substituents and thereby are well known to be condensable as phenols with such common condensing agents as aldehydes, as well as polymerizable, in the long-chain unsaturated fatty acid substituents, by oxidation, heat treatment in the presence of acid and sulphurization, etc., as listed above. Thus applicant's resinification may be in the nature of a condensation or polymerization, or both, and is effected in situ upon the natural oil as contained in the shell, without extraction.

For purposes of resinification by condensation, reaction may be effected upon the natural shell containing its natural oil, which may be broken into fragments or ground into granules of any preselected size, or as naturally obtained, after merely removing the nut kernels. The condensation may be effected with aldehydes, such as formaldehyde, typically commercial formalin, acetaldehyde, or higher aliphatic aldehydes, including dialdehydes of the character of oxalaldehyde, or aromatic and heterocyclic aldehydes, such as furfuraldehyde, benzaldehyde, etc. Such condensation may be effected by heating with or without solvents, such as water, at temperatures ranging from 80° to 300° C., the exact temperature usually being governed by the refluxing temperature of the solvent selected. Over a variable period of time, usually governed by the activity of the aldehyde, such applied heat treatment being usually only necessary for a period to initiate reaction, the reaction thereafter running exothermically with consequent rise in temperature of the mass and often requiring cooling to regulate the rate of reaction. The reaction may be run without a catalyst but is generally accelerated by alkaline and acid catalysts: for example, 50% mineral acid, such as hydrochloric or sulphuric acid, is thus commonly used in the art and effective herein, such catalysts being present in quantity of merely 2 or 3%, which is generally satisfactory. It will be understood, as typical in formation of phenolic resins, the reaction by condensation will run to an initial state of resin formation allowing the final molding powder to be used by giving it a final thermoset in the mold. As obtained in the initial reaction, the aldehyde condensate is merely freed of solvent, washed, dried and then ground to form the molding powder.

The product formed by polymerization reactions is more widely variable in character, and the molding powder in most instances retains its thermoplasticity and is obtained in varying degrees of flexibility, brittleness and hardness, and the final molding thereof is governed by the specific properties of each product, following procedures well known in the art. In a typical oxidation, the shell fragments containing the oil may be heated directly with such oxidizing agents as nitric acid, or may be heated in the presence of air. However, it is preferred to effect such oxidation in the presence of a solvent or liquid suspending medium, such as water or other liquids of a generally inert character. In using such liquid medium, oxidizing catalysts, such as manganese dioxide, potassium dichromate and organic peroxides of the character of acid peroxides; for example, benzoyl peroxide or acetyl peroxide, may be heated in combination with air, sulphur, nitric acid or chlorine to effect the polymerization.

The cashew nut shells containing its natural oil content may further be polymerized in situ by use of straight polymerizing agents, such as, concentrated sulphuric acid, anhydrous metal halides, such as zinc chloride, aluminum chloride, boronfluoride or phosphorous oxychloride. Such polymerization may be effected merely by heat in the presence of the catalyst.

Example I 100 parts by weight (300 grams) of ground cashew nut shells containing its natural oil and 80 parts by weight (240 grams) of commercial formalin, and 5 grams of concentrated hydrochloric acid and 5 grams of water are refluxed in a three-necked flask with stirring motor and refluxing condenser on a hot plate for two hours. Thereafter the water is poured off, the resin containing shells are washed once with water and dried at 130° to 135° in a drying oven. The product is a dark brittle resin containing by analysis 32% of phenolaldehyde resin and 68% of fibrous filler. It is ground into a molding powder and used directly for making phenolic plastic products or may be blended with other resins, coloring materials, etc., to make resins of desired characteristics. Other aldehyde phenolic condensates may be similarly made following this procedure using other aldehydes and it will be understood that other types of catalysts, such as dilute alkali, sodium hydroxide, ammonia, or other mineral acids, such as sulphuric acid, may be used, or by heating for a longer period of time the catalyst may be omitted.

Example II 115 parts by weight of cashew nut shells containing the natural oil is heated with agitation with 3 parts by weight of concentrated sulphuric acid and 2½ parts by weight of ethyl alcohol to a temperature of approximately 340° F. Thereafter the reaction will proceed exothermically and will increase to about 360° F. The final product is a dark resinous and brittle mass which may be ground to a powder after first washing with water or dilute alkali to remove traces of acid and drying as described in Example I. Other typical condensing agents for this reaction may be substituted for the sulphuric acid, such as diethylsulphate, zinc chloride, aluminum chloride or phosphorous oxychloride.

Example III 115 parts of cashew nut shells containing the natural oil content are suspended with stirring in 100 parts by weight of water and 3% by weight of manganese dioxide and heated to reflux on a hot plate while a stream of warm air is bubbled through the boiling suspension for a period of three hours. A dark resinous mass which becomes brittle on cooling is obtained, which is washed and may be ground after drying. Other suitable oxidizing catalysts, such as potassium dichromate, manganese resinate or lead resinate may be used.

Example IV 100 parts by weight of cashew nut shells containing its natural oil content is mixed with an equal quantity by weight of concentrated nitric acid cut with equal parts of water and an oxidizing reaction immediately ensues, the reaction being strongly exothermic and must be controlled by cooling; reaction is completed in a few minutes to give a dark brittle resin which is freed of acid by washing and is then dried in warm air, and ground. In this example, mixtures of nitric acid, sulphuric acid or other salt type oxidizing catalysts, as listed in Example III, may be used.

Example V 100 parts by weight of cashew nut shells containing its natural oil content are refluxed with 40 parts by weight of dry glycerine and 10 parts by weight of powdered sulphur at a temperature of about 245° C. for 40 minutes and then allowed to stand overnight. The product is washed with water and then dried in air. A dark rubbery mass is obtained. In this reaction the temperature may range up to 300°. Glycerine may be substituted by other solvents such as glycol, Carbitol (diethylene glycol monoethyl ether), or other high boiling aliphatic alcohols. The sulphur may be varied in quantity from 5 to 40% and certain vulcanizing accelerators, such as mercapto benzothiazol may be added to shorten the time of reaction. In a modification of this method the cashew nut shells containing the natural liquid may be directly heated with sulphur in which case the temperature is raised to about 400° C. for a short period of about fifteen minutes. Excess sulphur may be removed by washing with acetone or carbondisulphide. This valuable rubbery product is suitable for direct moldings or as a filler material for other rubber products. The reaction may be carried out with rubber compounding ingredients, such as carbon black and zinc oxide.

Example VI 100 parts by weight of cashew nut shells containing its natural oil content are agitated in a flask without a solvent while passing chlorine gas therethrough at a temperature of 150° C. A grayish-brown resin is obtained, which softens with heat and is soluble in hydrocarbon solvent.

It will be appreciated that various modifications of the present invention will occur to those skilled in the art. For example, the cashew nut shell containing its natural oil content may first be blended with other resin forming reagents, such as other phenols or other polymerizable compounds such as styrene, methyl methacrylate, polyvinyl chloride, polyvinyl acetate, polyvinyl butyl acetal, aceto nitrile, mixtures of hexamethylene diamine and adipic acid, butadiene, chloroprene, natural rubber latex or synthetic latices, drying oils such as linseed, tung oil etc., rosin, and other natural and synthetic resins and resin forming components, and then condensation and polymerization of the total mixture, including the added resinifying agents, if not already resinified, may be effected together with the cashew shell and natural oil content thereof.

It is accordingly intended that the foregoing examples be regarded as exemplary and not limiting except as defined in the claims.

I claim:

1. A molding compound, comprising cashew nut shell as the filler and the resinous material comprising the naturally occurring oils of the cashew nut shell reacted in situ to an intermediate stage of polymeric growth.

2. The molding compound as claimed in claim 1, wherein the resinous material formed by the reacted cashew nut shell oils is characterized by thermosetting properties.

3. In the method of preparing a resinous compound having cashew nut shell filler, the step of subjecting cashew nut shell oils in situ in the shell to a condensation reaction at temperatures of about 350° F. in the presence of acidic catalyst.

4. In the method of preparing a resinous compound having natural cashew nut shell filler, the steps of subjecting the cashew nut shells in finely divided form to a temperature in the range of 80–300° C. in the presence of an aldehyde and a condensation catalyst to convert the polymerizable oils in the cashew nut shell to a condensation resinous reaction product.

5. In the method of preparing a resinous compound having natural cashew nut shell filler, the step of reducing the cashew nut shell to finely divided form, heating the cashew nut shell to a temperature within the range of 80–300° C. in the presence of aldehyde and a condensation catalyst to react the polymerizable oils to a condensation resinous reaction product.

6. In the method of preparing a resinous compound having natural cashew nut shell filler, the step of subjecting the cashew nut shells in finely divided form to a temperature within the range of 80–300° C. in the presence of a catalyst to promote the reaction of the natural polymerizable oils in the cashew nut shell to a corresponding condensation resinous reaction product.

7. A molding compound comprising cashew nut shells in finely divided form as the filler and a resinous material uniformly distributed throughout the cashew nut shells in accordance with the natural distribution of the oils originally contained therein from which the resinous material is formed by reaction in situ to an intermediate stage of polymeric growth in the presence of formaldehyde and a catalyst at a temperature of 80–300° C. for up to two hours.

8. In the method of preparing a resinous compound having natural cashew nut shell filler, the steps of reducing the shell to finely divided form, and heating the shell at a temperature within the range of 80–300° C. in the presence of an aldehyde and a condensation catalyst to react the polymerizable oils in the cashew nut shell to a condensation resinous reaction product.

CLARENCE T. NEMIR.

REFERENCES CITED

The following references are of record in the file of this patent:

UNITED STATES PATENTS

| Number | Name | Date |
| --- | --- | --- |
| 1,784,628 | Hughes | Dec. 9, 1930 |

FOREIGN PATENTS

| Number | Country | Date |
| --- | --- | --- |
| 412,373 | Canada | May 11, 1943 |

OTHER REFERENCES

Mattiello: Protective and Decorative Coatings, vol. 1, pages 85–88, pub. by John Wiley & Sons Inc. (1941).